US012798494B2

(12) United States Patent
Du

(10) Patent No.: US 12,798,494 B2
(45) Date of Patent: Nov. 17, 2026

(54) MAGNETIC AND FOLDABLE MOBILE PHONE HOLDER HAVING CHARGING FUNCTION IN VEHICLE AND HAVING RETRACTABLE CHARGING CABLE

(71) Applicant: Dongguan Jinchi Electronic Technology Co., Ltd., Dongguan (CN)

(72) Inventor: Pengcheng Du, Dongguan (CN)

( * ) Notice: Subject to any disclaimer, the term of this patent is extended or adjusted under 35 U.S.C. 154(b) by 14 days.

(21) Appl. No.: 19/187,266

(22) Filed: Apr. 23, 2025

(65) Prior Publication Data

US 2026/0116314 A1 Apr. 30, 2026

(30) Foreign Application Priority Data

Oct. 30, 2024 (CN) ........................ 202422633372.X

(51) Int. Cl.
*B60R 11/02* (2006.01)
*G06F 1/16* (2006.01)
*H02G 11/02* (2006.01)
*H02J 50/00* (2016.01)
*B60R 11/00* (2006.01)

(52) U.S. Cl.
CPC .......... *B60R 11/0241* (2013.01); *G06F 1/166* (2013.01); *H02G 11/02* (2013.01); *H02J 50/005* (2020.01); *B60R 2011/0007* (2013.01); *B60R 2011/007* (2013.01)

(58) Field of Classification Search
CPC ......... B60R 11/0241; B60R 2011/0007; B60R 2011/007; G06F 1/166; H02G 11/02; H02J 50/005; H04M 1/04; F16M 11/041; F16M 11/125; F16M 13/022; F16M 11/10; F16M 11/2064; F16M 13/00
See application file for complete search history.

(56) References Cited

U.S. PATENT DOCUMENTS 5,414,770 A * 5/1995 Wang .................. B60R 11/0241 379/454
5,839,919 A * 11/1998 Chen .................. B60R 11/0241 439/529
5,860,824 A * 1/1999 Fan .................... B60R 11/0241 439/669
6,138,041 A * 10/2000 Yahia .................. H04M 1/6075 379/446
6,433,274 B1 * 8/2002 Doss ..................... H02G 11/02 174/59
6,478,276 B1 * 11/2002 Louh .................. B60R 11/0241 248/346.06

(Continued)

*Primary Examiner* — Ko H Chan

(57) ABSTRACT

The present disclosure relates to a magnetic and foldable mobile phone holder having a charging function in a vehicle and having a retractable charging cable. The mobile phone holder includes a lower housing, where an upper housing is mounted on the lower housing, a data cable module and a rotating block are mounted, and the rotating block is connected to a supporting arm. An end of the supporting arm is connected to an upper connecting member, a bottom cover is mounted, and a first aluminum alloy middle frame or a second aluminum alloy middle frame is mounted. A top of the first aluminum alloy middle frame or the second aluminum alloy middle frame is fixedly provided with a surface cover, a magnet is fixedly mounted inside the surface cover, and a lens or a surface sticker is fixedly mounted at a top of the surface cover.

6 Claims, 3 Drawing Sheets

(56) References Cited

U.S. PATENT DOCUMENTS

| | | | | |
|---|---|---|---|---|
| 6,612,875 | B1 * | 9/2003 | Liao | H01R 31/06 439/675 |
| 6,687,513 | B1 * | 2/2004 | Hsu Li | B60R 11/0241 379/446 |
| 6,888,940 | B1 * | 5/2005 | Deppen | B60R 11/0241 379/454 |
| 6,923,686 | B1 * | 8/2005 | Cheng | H04M 1/04 439/529 |
| 7,062,300 | B1 * | 6/2006 | Kim | B60R 11/0241 455/90.3 |
| 7,183,743 | B2 * | 2/2007 | Geiger | B60R 11/02 320/111 |
| 10,931,073 | B1 * | 2/2021 | Oliverio | H01R 13/72 |
| 2002/0159587 | A1 * | 10/2002 | Chang | H04M 1/04 379/454 |
| 2002/0187816 | A1 * | 12/2002 | Ou | H04M 1/6041 455/573 |
| 2002/0191782 | A1 * | 12/2002 | Beger | H04M 1/04 379/454 |
| 2003/0053854 | A1 * | 3/2003 | Lu | F16M 11/10 403/165 |
| 2003/0228792 | A1 * | 12/2003 | Lanni | H02G 11/02 439/528 |
| 2004/0254002 | A1 * | 12/2004 | Tsay | H04M 1/04 455/575.1 |
| 2006/0111076 | A1 * | 5/2006 | Davie | B60R 11/0241 455/347 |
| 2007/0262223 | A1 * | 11/2007 | Wang | B60R 11/0241 248/346.07 |
| 2008/0090464 | A1 * | 4/2008 | Azoulay | H01R 31/06 439/668 |
| 2008/0207276 | A1 * | 8/2008 | Burrell | B60R 11/0241 455/573 |
| 2011/0255226 | A1 * | 10/2011 | Duncan Seil | B60R 11/02 361/679.01 |
| 2017/0353591 | A1 * | 12/2017 | Abramovich | H01R 24/68 |
| 2023/0051385 | A1 * | 2/2023 | Ma | B60R 11/0241 |
| 2024/0209983 | A1 * | 6/2024 | Lv | F16M 13/04 |
| 2024/0401738 | A1 * | 12/2024 | Parsian | F16M 11/041 |
| 2024/0410523 | A1 * | 12/2024 | Caspersen | F16M 11/128 |
| 2025/0067389 | A1 * | 2/2025 | Fan | F16M 13/022 |

* cited by examiner

MAGNETIC AND FOLDABLE MOBILE PHONE HOLDER HAVING CHARGING FUNCTION IN VEHICLE AND HAVING RETRACTABLE CHARGING CABLE

CROSS-REFERENCE TO RELATED APPLICATIONS

The present application claims priority to Chinese Patent Application No. 202422633372. X, filed on Oct. 30, 2024, the entire disclosure of which is incorporated herein by reference.

TECHNICAL FIELD

The present disclosure relates to the technical field of mobile phone holders, and in particular to a magnetic and foldable mobile phone holder having a charging function in a vehicle and having a retractable charging cable.

An existing vehicle-mounted mobile phone holder is adhered to a console or clamped at an air outlet position. When a mobile phone needs to be charged, it needs to be connected to a charging interface position of a vehicle through a data cable, which makes an interior circuit of the vehicle disordered, and affects its appearance.

A position of a vehicle-mounted cigarette lighter is a very good power supply interface. However, most existing vehicle-mounted mobile phone holders are not designed in alignment with the vehicle-mounted cigarette lighter, leaving a power supply position of the vehicle-mounted cigarette lighter unused. Therefore, the present disclosure provides a magnetic and foldable mobile phone holder having a charging function in a vehicle and having a charging cable.

SUMMARY

An objective of the present disclosure is to provide a magnetic and foldable mobile phone holder having a charging function in a vehicle and having a retractable charging cable, so as to solve the problems mentioned in the background art.

To achieve the above objective, the present disclosure provides the technical solutions as follows:

A magnetic and foldable mobile phone holder having a charging function in a vehicle and having a retractable charging cable, including a lower housing, where an upper housing is fixedly mounted at a top of the lower housing, a data cable module is fixedly mounted between the upper housing and the lower housing, a rotating block is fixedly mounted at a top of the upper housing, and one end of the rotating block is rotationally connected to a supporting arm. An end, farthest away from the rotating block, of the supporting arm is rotationally connected to an upper connecting member, a bottom cover is fixedly mounted at a top of the upper connecting member, and a first aluminum alloy middle frame or a second aluminum alloy middle frame is fixedly mounted at a top of the bottom cover.

A top of the first aluminum alloy middle frame or the second aluminum alloy middle frame is fixedly provided with a surface cover, a magnet is fixedly mounted inside the surface cover, and a lens or a surface sticker is fixedly mounted at a top of the surface cover.

Through holes are provided at two ends of a lower portion of the lower housing, an elastic clip is placed on an inner wall of the lower housing, first convex pins are fixedly arranged at two ends of the elastic clip, and the first convex pins extend out of the lower housing through the through holes.

The charging cable is arranged on the data cable module, a circuit board is fixedly mounted inside the lower housing, the circuit board is electrically connected to the data cable module, and the elastic clip is electrically connected to the circuit board.

In a preferred embodiment of the present disclosure, a step through hole is provided at a bottom of the lower housing, a second convex pin is arranged inside the step through hole, a spring is fixedly connected to a bottom of the circuit board, and the second convex pin is fixedly connected to a bottom of the spring.

In a preferred embodiment of the present disclosure, a second groove is provided in a middle of the top of the upper housing, a first groove is provided in a front end of the upper housing, and the rotating block is inserted into the second groove and fixed through a screw.

In a preferred embodiment of the present disclosure, a first rotary connection position is arranged at a rear end of the rotating block, the supporting arm is arranged above the rotating block, a second rotary connection position is arranged at a rear end of the supporting arm, and the second rotary connection position is connected to the first rotary connection position through a long rotating shaft. A front end of the supporting arm is provided with a third rotary connection position, and the third rotary connection position is connected to a bottom of the upper connecting member through a short rotating shaft.

In a preferred embodiment of the present disclosure, a bottom of the bottom cover is provided with a positioning groove, a top of the upper connecting member is provided with a positioning pin, and the positioning pin is inserted into the positioning groove and connected through a screw.

In a preferred embodiment of the present disclosure, a wireless charging printed circuit board (PCB) is fixedly mounted inside the aluminum alloy middle frame I, a charging interface is fixedly arranged at a front end of the wireless charging PCB, an insertion hole is fixedly arranged at a front end of the aluminum alloy middle frame I, and the charging interface is provided at an inner wall of the insertion hole.

Additional aspects and advantages of the present disclosure will be set forth partially and will become obvious in the following description, or may be learned by practice of the present disclosure.

A rotating and hovering function can be achieved after an elastic sheet position of a bottom of the magnetic and foldable mobile phone holder is inserted into a vehicle-mounted cigarette lighter, and an up-and-down folding function can be realized through a swing rod in a middle. An upper portion of the magnetic and foldable mobile phone holder can be compatible with POPsockets (airbag ring holder) and Ring (ordinary ring holder). Currently, a vehicle-mounted mobile phone holder having a charging function in a vehicle on the market only supports the charging function under a use environment, and does not support a magsafe magnetic holder function. The magnetic and foldable mobile phone holder combines the cigarette lighter charging function with the magsafe magnetic holder function or wireless charging. A lower portion of the magnetic and foldable mobile phone holder is fixed through an elastic sheet to be compatible with the cigarette lighter position of most vehicle models on the market. The hollow design of the upper portion is compatible with POPsockets (airbag ring holder) and Ring (ordinary ring holder) for use and is applicable to bare mobile phones of magsafe Iphone mobile phones and magsafe magnetic housings, and the mobile phone holder can be used in combination with ring iron sheets for mobile phones of other models. The magnetic and foldable mobile phone holder is provided with a retractable charging cable module including an Apple Lightning charging cable and a TYPE-C charging cable, and the upper wireless charging magnetic holder supports wireless charging of Iphone mobile phones.

The magnetic and foldable mobile phone holder having a charging function in a vehicle and having a retractable charging cable is internally provided with the charging cable module, including the Iphone Lightning charging cable and the TYPE-C charging cable. The upper portion of the magnetic and foldable mobile phone holder and upper and lower positions of the swing rod each are provided with a damping shaft, such that rotation and hovering of a base and the rotating block can be realized, which facilitates angle adjustment. At present, the vehicle-mounted mobile phone holder having a charging function in a vehicle on the market has not the magsafe function. The upper portion of the magnetic and foldable mobile phone holder is in hollow design, such that when the POPsockets (airbag ring holder) and Ring (ordinary ring holder) are used for a mobile phone, the upper portion can provide space, such that use is not affected.

BRIEF DESCRIPTION OF THE DRAWINGS

The above-mentioned and/or attached aspects and advantages of the present disclosure will become apparent and easy to understand from the description of the examples with reference to the following accompanying drawings, in which.

Figure 1:
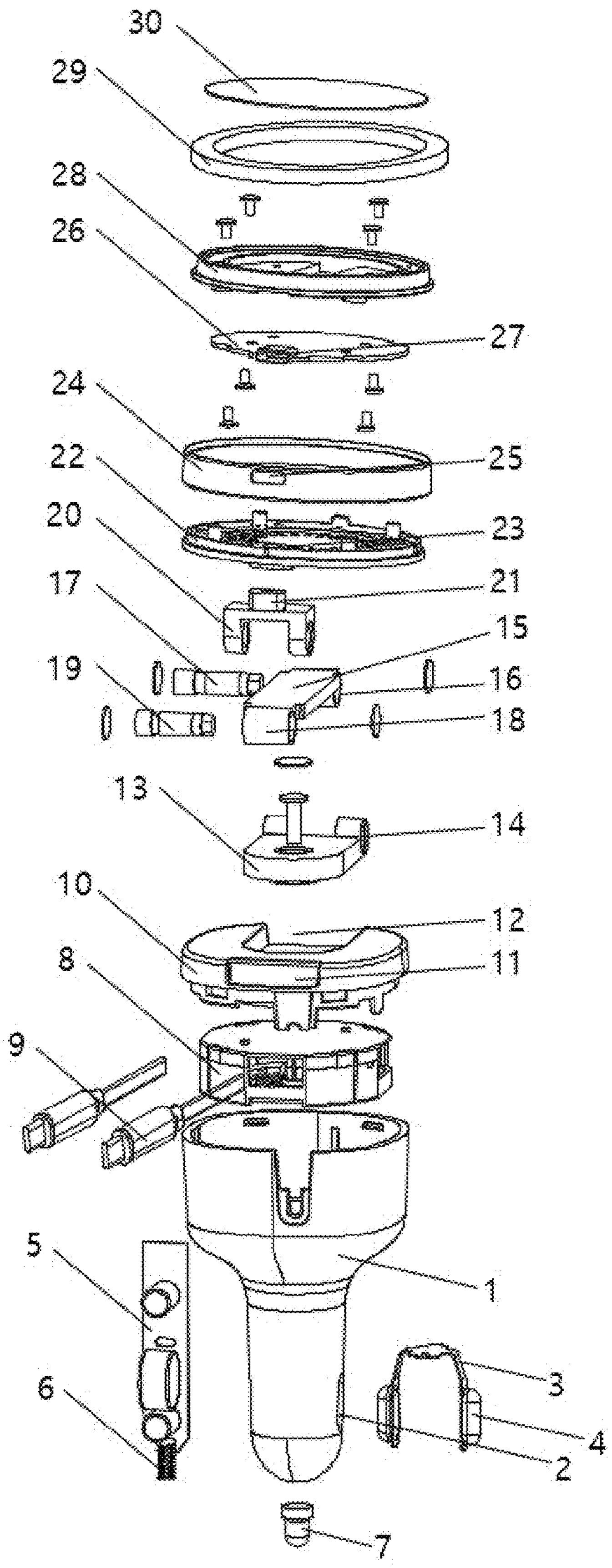
FIG. 1 is a first schematic exploded diagram of a magnetic and foldable mobile phone holder having a charging function in a vehicle and having a retractable charging cable.

In the figures: 1. lower housing; 2. through hole; 3. elastic clip; 4. first convex pin; 5. circuit board; 6. spring; 7. second convex pin; 8. data cable module; 9. charging cable; 10. upper housing; 11. first groove; 12. second groove; 13. rotating block; 14. first rotary connection position; 15. supporting arm; 16. second rotary connection position; 17. long rotating shaft; 18. third rotary connection position; 19. short rotating shaft; 20. upper connecting member; 21. positioning pin; 22. bottom cover; 23. positioning groove; 24. first aluminum alloy middle frame; 25. insertion hole; 26. wireless charging printed circuit board (PCB); 27. charging interface; 28. surface cover; 29. magnet; 30. lens; 31. second aluminum alloy middle frame; and 32. surface sticker.

DETAILED DESCRIPTIONS OF THE EMBODIMENTS

Examples of the present disclosure are described in detail below, instances of the examples are shown in the accompanying drawings, throughout which identical or similar reference numerals denote identical or similar elements or elements having identical or similar functions. The examples described below with reference to the accompanying drawings are exemplary and intended to explain the present disclosure, instead of being construed as limiting the present disclosure.

Example 1

Referring to FIG. 1, provided is a magnetic and foldable mobile phone holder having a charging function in a vehicle and having a retractable charging cable, including a lower housing 1, where an upper housing 10 is fixedly mounted at a top of the lower housing 1, a data cable module 8 is fixedly mounted between the upper housing 10 and the lower housing 1, a rotating block 13 is fixedly mounted at a top of the upper housing 10, and one end of the rotating block 13 is rotationally connected to a supporting arm 15. An end, farthest away from the rotating block 13, of the supporting arm 15 is rotationally connected to an upper connecting member 20, a bottom cover 22 is fixedly mounted at a top of the upper connecting member 20, and a first aluminum alloy middle frame 24 is fixedly mounted at a top of the bottom cover 22. Specifically, the lower housing 1 can be inserted into a vehicle-mounted cigarette lighter, and is connected to circuit contacts inside the vehicle-mounted cigarette lighter through first convex pins 4 of an elastic clip 3. The elastic clip 3 transmits electricity at the position of the vehicle-mounted cigarette lighter to the data cable module 8, and the data cable module 8 is arranged as a retractable charging cable. The rotating block 13 has a rotating effect on the supporting arm 15, the supporting arm 15 has a rotating effect on the upper connecting member 20, the upper connecting member 20 has a supporting effect on the bottom cover 22, and the bottom cover 22 has a fixing effect on the first aluminum alloy middle frame 24.

A top of the first aluminum alloy middle frame 24 is fixedly provided with a surface cover 28, a magnet 29 is fixedly mounted inside the surface cover 28, and a lens 30 is fixedly mounted at a top of the surface cover 28.

Through holes 2 are provided at two ends of a lower portion of the lower housing 1, the elastic clip 3 is placed on an inner wall of the lower housing 1, the first convex pins 4 are fixedly arranged at two ends of the elastic clip 3, and the first convex pins 4 extend out of the lower housing 1 through the through holes 2. The elastic clip 3 and the first convex pins 4 are made of metal materials.

The charging cable 9 is arranged on the data cable module 8, a circuit board 5 is fixedly mounted inside the lower housing 1, the circuit board 5 is electrically connected to the data cable module 8, and the elastic clip 3 is electrically connected to the circuit board 5.

A step through hole is provided at a bottom of the lower housing 1, a second convex pin 7 is arranged inside the step through hole, a spring 6 is fixedly connected to a bottom of the circuit board 5, and the second convex pin 7 is fixedly connected to a bottom of the spring 6.

A second groove 12 is provided in a middle of the top of the upper housing 10, a first groove 11 is provided in a front end of the upper housing 10, and the rotating block 13 is inserted into the second groove 12 and fixed through a screw.

A first rotary connection position 14 is arranged at a rear end of the rotating block 13, the supporting arm 15 is arranged above the rotating block 13, a second rotary connection position 16 is arranged at a rear end of the supporting arm 15, and the second rotary connection position 16 is connected to the first rotary connection position 14 through a long rotating shaft 17. A front end of the supporting arm 15 is provided with a third rotary connection position 18, and the third rotary connection position 18 is connected to a bottom of the upper connecting member 20 through a short rotating shaft 19.

A bottom of the bottom cover 22 is provided with a positioning groove 23, a top of the upper connecting member 20 is provided with a positioning pin 21, and the positioning pin 21 is inserted into the positioning groove 23 and connected through a screw.

A wireless charging printed circuit board (PCB) 26 is fixedly mounted inside the first aluminum alloy middle frame 24, a charging interface 27 is fixedly arranged at a front end of the wireless charging PCB 26, an insertion hole 25 is fixedly arranged at a front end of the first aluminum alloy middle frame 24, and the charging interface 27 is arranged on an inner wall of the insertion hole 25. The wireless charging PCB 26 has a wireless charging effect on a mobile phone, and a connector of the charging cable 9 can be connected to the charging interface 27.

The working principle of the present disclosure is: the elastic clip 3 at the bottom of the lower housing 1 is inserted into the vehicle-mounted cigarette lighter, and is connected to the circuit contacts inside the vehicle-mounted cigarette lighter through the first convex pins 4 of the elastic clip 3. The elastic clip 3 transmits electricity at the position of the vehicle-mounted cigarette lighter to the data cable module 8. A mobile phone with a mobile phone housing having a magnetic function is placed at the position of the lens 30, and is attracted through the magnet 29, and the charging cable 9 is drawn out and connected to the charging interface 27. A height of the first aluminum alloy middle frame 24 can be adjusted through the supporting arm 15.

Example 2

Figure 2:
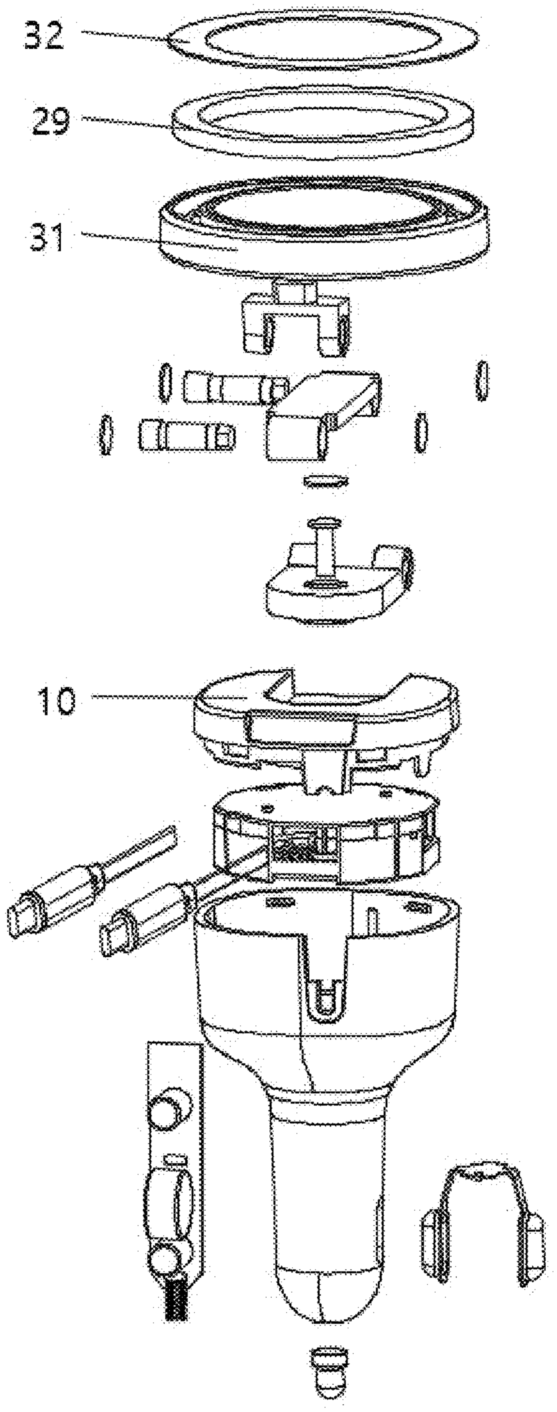
FIG. 2 is a second schematic exploded diagram of a magnetic and foldable mobile phone holder having a charging function in a vehicle and having a retractable charging cable.
Figure 3:
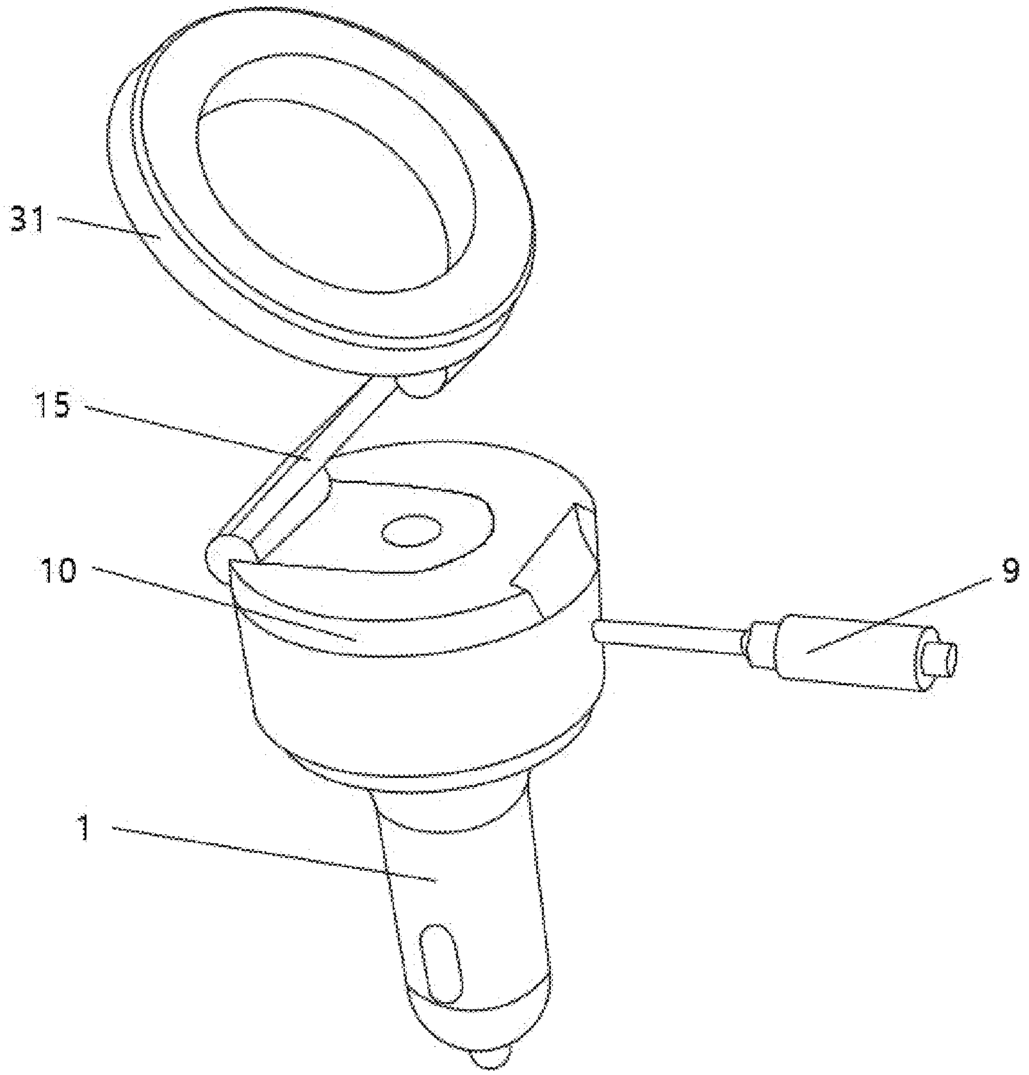
FIG. 3 is a perspective diagram of a magnetic and foldable mobile phone holder having a charging function in a vehicle and having a retractable charging cable.

Referring to FIGS. 2 and 3, a magnetic and foldable mobile phone holder having a charging function in a vehicle and having a retractable charging cable, a second aluminum alloy middle frame 31 is fixedly mounted at a top of a bottom cover 22, a top of the second aluminum alloy middle frame 31 is fixedly provided with a surface cover 28, a magnet 29 is fixedly mounted inside the surface cover 28, and a surface sticker 32 is fixedly mounted at a top of the surface cover 28.

The working principle of the present disclosure is: an elastic clip 3 at a bottom of a lower housing 1 is inserted into a vehicle-mounted cigarette lighter, and is connected to circuit contacts inside the vehicle-mounted cigarette lighter through first convex pins 4 of the elastic clip 3. The elastic clip 3 transmits electricity at the position of the vehicle-mounted cigarette lighter to a data cable module 8. A mobile phone with a mobile phone housing having a magnetic function is placed at the position of the surface cover 28, and is attracted through the magnet 29, and the charging cable 9 is drawn out and connected to a charging interface of the mobile phone. A height of the first aluminum alloy middle frame 24 can be adjusted through a supporting arm 15.

Although the examples of the present disclosure have been illustrated and described, it should be understood that those of ordinary skill in the art may make various changes, modifications, replacements and variations to these examples without departing from the principle and purpose of the present disclosure, and the scope of the present disclosure is limited by the appended claims and their legal equivalents.

What is claimed is:

1. A magnetic and foldable mobile phone holder having a charging function in a vehicle and having a retractable charging cable, comprising a lower housing, wherein an upper housing is fixedly mounted at a top of the lower housing, a data cable module is fixedly mounted between the upper housing and the lower housing, a rotating block is fixedly mounted at a top of the upper housing, one end of the rotating block is rotationally connected to a supporting arm, an end, farthest away from the rotating block, of the supporting arm is rotationally connected to an upper connecting member, a bottom cover is fixedly mounted at a top of the upper connecting member, and a first aluminum alloy middle frame or a second aluminum alloy middle frame is fixedly mounted at a top of the bottom cover;

a top of the first aluminum alloy middle frame or the second aluminum alloy middle frame is fixedly provided with a surface cover, a magnet is fixedly mounted inside the surface cover, and a lens or a surface sticker is fixedly mounted at a top of the surface cover;

through holes are provided at two ends of a lower portion of the lower housing, an elastic clip is placed on an inner wall of the lower housing, first convex pins are fixedly arranged at two ends of the elastic clip, and the first convex pins extend out of the lower housing through the through holes; and the charging cable is arranged on the data cable module, a circuit board is fixedly mounted inside the lower housing, the circuit board is electrically connected to the data cable module, and the elastic clip is electrically connected to the circuit board.

2. The magnetic and foldable mobile phone holder having a charging function in a vehicle and having a retractable charging cable according to claim 1, wherein a step through hole is provided at a bottom of the lower housing, a second convex pin is arranged inside the step through hole, a spring is fixedly connected to a bottom of the circuit board, and the second convex pin is fixedly connected to a bottom of the spring.

3. The magnetic and foldable mobile phone holder having a charging function in a vehicle and having a retractable charging cable according to claim 1, wherein a second groove is provided in a middle of the top of the upper housing, a first groove is provided in a front end of the upper housing, and the rotating block is inserted into the second groove and fixed through a screw.

4. The magnetic and foldable mobile phone holder having a charging function in a vehicle and having a retractable charging cable according to claim 3, wherein a first rotary connection position is arranged at a rear end of the rotating block, the supporting arm is arranged above the rotating block, a second rotary connection position is arranged at a rear end of the supporting arm, the second rotary connection position is connected to the first rotary connection position through a long rotating shaft, a front end of the supporting arm is provided with a third rotary connection position, and the third rotary connection position is connected to a bottom of the upper connecting member through a short rotating shaft.

5. The magnetic and foldable mobile phone holder having a charging function in a vehicle and having a retractable charging cable according to claim 1, wherein a bottom of the bottom cover is provided with a positioning groove, a top of the upper connecting member is provided with a positioning pin, and the positioning pin is inserted into the positioning groove and connected through a screw.

6. The magnetic and foldable mobile phone holder having a charging function in a vehicle and having a retractable charging cable according to claim 1, wherein a wireless charging printed circuit board (PCB) is fixedly mounted inside the first aluminum alloy middle frame, a charging interface is fixedly arranged at a front end of the wireless charging PCB, an insertion hole is fixedly arranged at a front end of the first aluminum alloy middle frame, and the charging interface is provided at an inner wall of the insertion hole.

* * * * *